March 10, 1964 A. R. PACKARD 3,124,178
CIRCULAR SAW VERSION OF A MULTI-PURPOSE TOOL HAVING A TILT ARBOR
Filed May 18, 1962 3 Sheets-Sheet 1
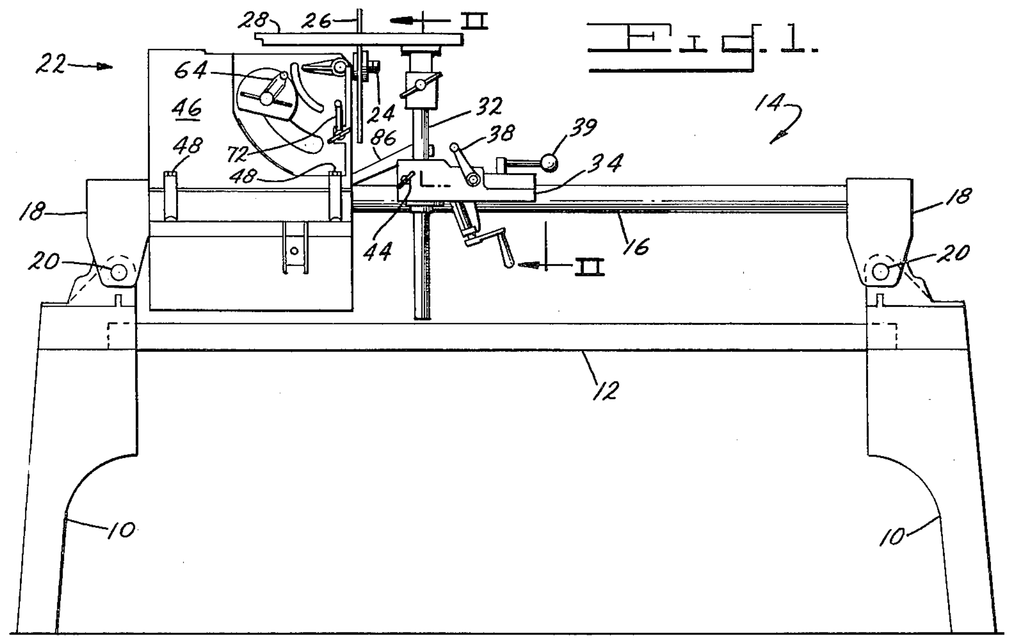
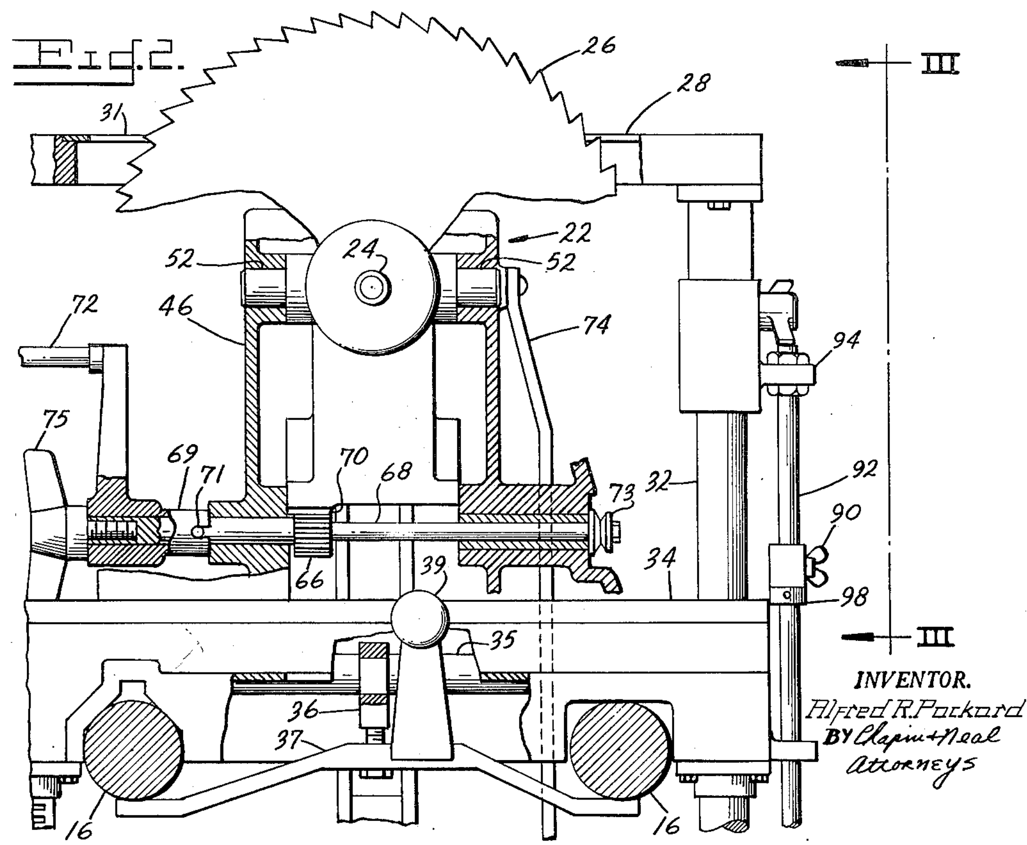

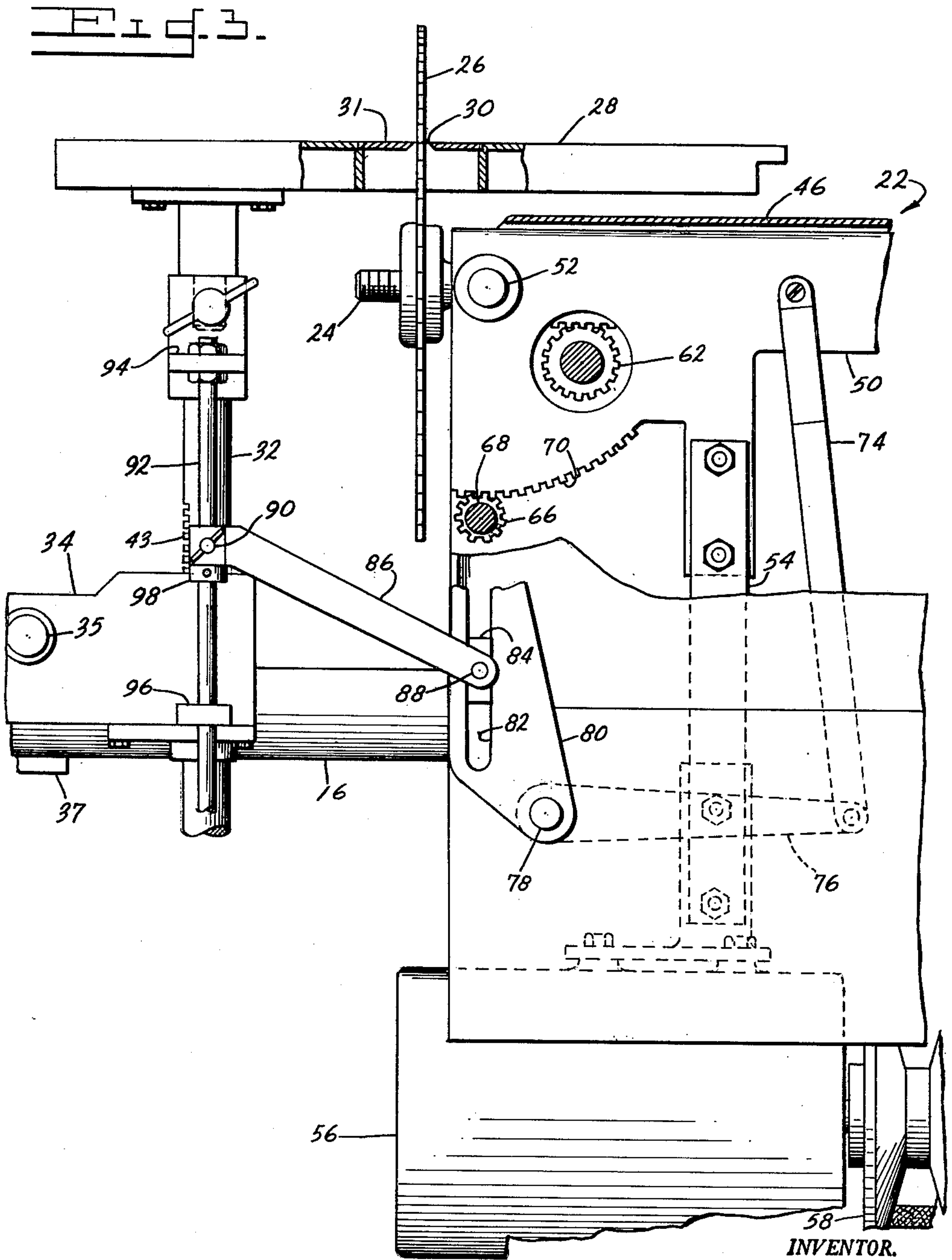
INVENTOR.
Alfred R. Packard
BY Chapin & Neal
attorneys

FIG. 4.

INVENTOR.
Alfred R. Packard
BY Chapin & Neal
Attorneys

United States Patent Office 3,124,178 Patented Mar. 10, 1964

1

3,124,178
CIRCULAR SAW VERSION OF A MULTI-PURPOSE TOOL HAVING A TILT ARBOR

Alfred R. Packard, Springfield, Mass., assignor to Toolkraft Corporation, Springfield, Mass., a corporation of Massachusetts Filed May 18, 1962, Ser. No. 195,756
8 Claims. (Cl. 143—36)

The present invention relates to improvements in the construction of multi-purpose power tools and more particularly to improved circular saw versions of such machines.

In recent years considerable success has been had by multi-purpose power tools intended primarily for the home workshop. This success is understandable since one tool, having a single power head, economically provides the functions of many different tools and yet requires a very limited amount of floor space.

Most, if not all, of these multi-purpose tools are capable of serving as circular saws. In fact, the circular saw is one of the most important tools in a home workshop. The circular saw versions of these multi-purpose tools are quite effective, except where provision is to be made for angle cuts. In single-purpose circular saws it has essentially become a universal practice to provide means for tilting the saw blade to obtain such angle cuts, except in the most inexpensive of saws. This tilt arbor feature, as it is referred to, offers much greater accuracy and safety as compared to the alternative approach of providing means for tilting the support table in order to obtain an angle cut.

It has been proposed in U.S. Patent No. 2,905,211 to provide a tilt arbor circular saw in a multi-purpose power tool environment. However, the circular saw version of a multi-purpose tool shown therein fails to provide for height of cut adjustment when making angle cuts. Further, the mechanism of that patent, while a relatively small number of parts are involved, is nonetheless expensive to manufacture so that a long life of the parts will be obtained.

Thus, in spite of the proposal in the patent referred to, all multi-purpose tools having any significant commercial success employ a tilting table when set up as a circular saw to make angle cuts.

The object of the invention is, therefore, to provide an improved and economical circular saw version of a multi-purpose tool wherein the saw blade is tilted for angle cuts and the support table remains horizontal.

The present invention is incorporated in a multi-purpose tool environment wherein a power head is provided with a driven spindle on which a circular saw blade is mounted. Means are provided for pivoting the spindle relative to the power head to adjust the angle of cut of the blade. A horizontal worktable overlies the spindle and is slotted to receive the blade which projects thereabove. The worktable is adjustable in a heightwise sense to vary the depth of cut of the blade. Means are then provided for shifting the table longitudinally of the spindle and maintaining said slot aligned with said blade as the angle of the blade and/or the height of the table are adjusted.

The above and other related objects and features of the invention will be apparent from a reading of the following description of the disclosure found in the accompanying drawings and the novelty thereof pointed out in the appended claims.

In the drawings:

FIG. 1 is an elevation of a multi-purpose tool embodying the present invention;

FIG. 2 is a section on an enlarged scale taken generally on line II—II in FIG. 1;

2

FIG. 3 is a view taken on line III—III in FIG. 2 with portions thereof broken away;

Figure 4:
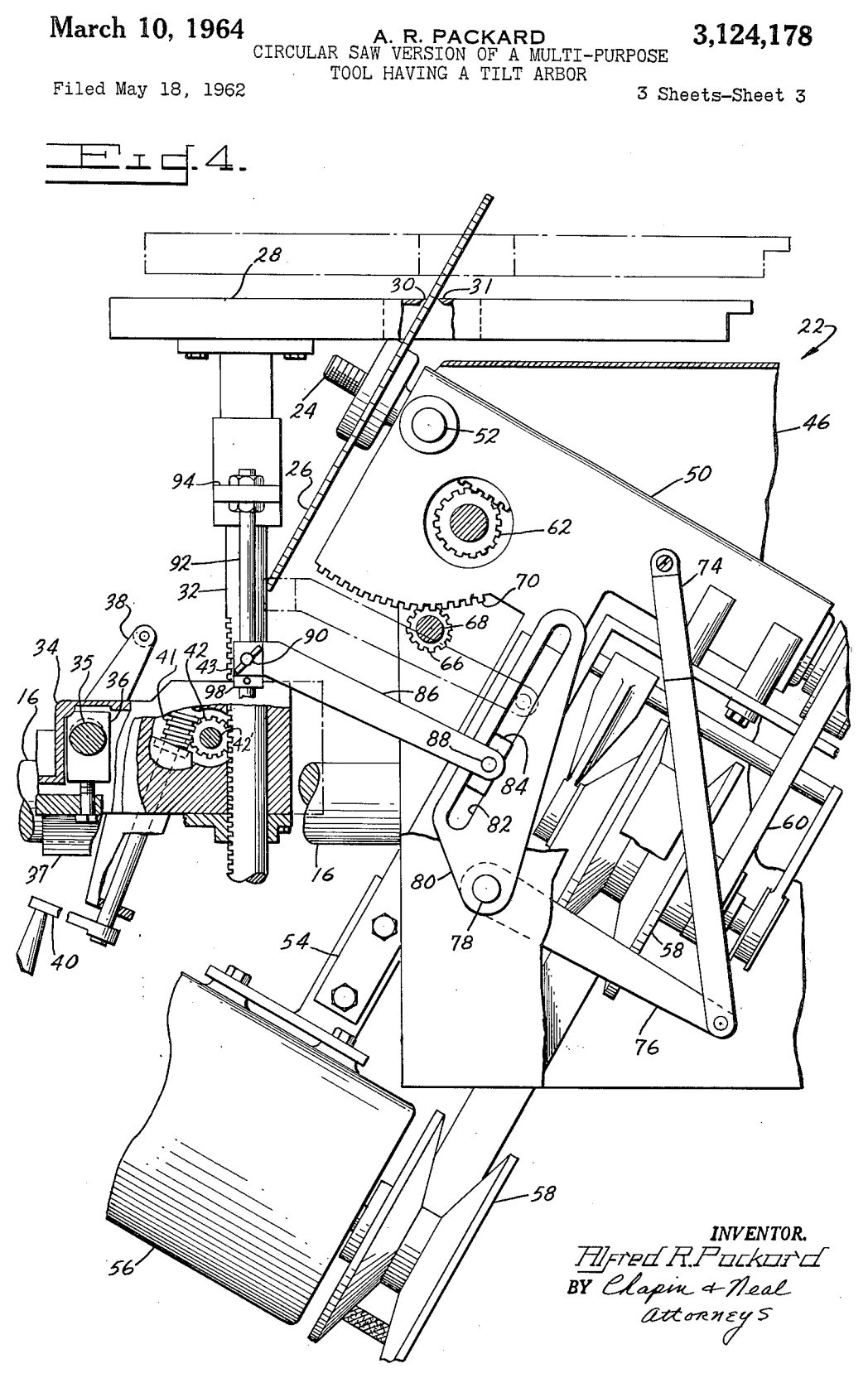

FIG. 4 is a view similar to that of FIG. 3 with different portions broken away and with the device suggested for a different angle of cut.

The multi-purpose tool or machine of the present invention (FIG. 1) comprises a main frame which is formed by pedestals 10 interconnected by rails 12. A sub-frame 14 comprises a guideway formed by bars 16. The bars 16 are joined at each end by brackets 18 which are pivotally mounted relative to the main frame. The sub-frame may be pivoted about pins 20 on the brackets 18 in order to convert the multi-purpose tool to serve various functions. A power head 22 is mounted on the sub-frame and, preferably, is slidably mounted on the rods 16 so that it may be adjusted along the length of the guideway provided thereby to effectively drive the several tools which are required in the various versions of the machine. These tools will be attached to a driven spindle 24 projecting from the power head.

The multi-purpose tool may serve several different functions. In the circular saw version illustrated, the sub-frame is in a horizontal position. The sub-frame would also be in a horizontal position in the lathe version of the machine. With the sub-frame tipped about the right hand end of the main frame the spindle 24 would face downwardly in the drill press version of the machine, and with the sub-frame pitched about the left hand end of the main frame, the spindle would face upwardly in the shaper version of the machine.

Reverting back to the circular saw version of the machine which is illustrated in the present drawings, a saw blade 26 is mounted on the spindle 24 and projects above a horizontally disposed table 28 which overlies the spindle 24 and is provided with a slot 30 aligned with the blade 26. Actually the slot 30 is formed in a plate 31 which is replaceable to provide slots of different widths. The table 28 is mounted on a pair of posts 32 which are supported by a carriage 34. The carriage 34 in turn is supported by the bars 16 and is arranged to slide therealong for purposes which later appear. Means are provided for locking the carriage 34 in any given position on the bars 16 (FIGS. 2 and 4) and take the form of a shaft 35 rotatably mounted on the carriage 34, a block 36 which receives an eccentric portion of the shaft 35 and a strap 37 secured to the block 36. The shaft 35 may be rotated by a handle 38 to draw the block 36 upwardly and clamp the strap 37 against the bars 16, thus clamping the carriage in fixed position on these bars. A handle 39 is attached to the strap 37 so that the strap may be swung clear of the bars 16 when the handle 38 has been rotated to the unclamping position. This is done to facilitate removal of the carriage 34 from the sub-frame 14 as would be necessary in the lathe version of this multi-purpose tool.

Means are provided for adjusting the heightwise position of the table 28. These means comprise a handle 40 having a worm 41 (FIG. 4) attached thereto and meshing with a gear 42 which is secured to a shaft 42' rotatably mounted on the carriage 34. The gear 42 in turn meshes with a rack 43 formed on one of the posts 32. The shaft 42' extends across the width of the carriage 34 and has a second gear 42 secured thereto which meshes with a rack 43 formed on the other post 32. By rotating the handle 40, the height of the table 28 may be varied relative to the saw blade 26 to thereby adjust the depth of the cut being made. A clamping screw 44 (FIG. 1) is provided to lock the table 28 in a given heightwise position.

The power head 22 comprises a housing 46 which is in the form of a hollow shell slidable along the bars 16 and held in a given position on said bars by clamping screws 48. A spindle journal 50 (FIG. 4) disposed within the housing 46 and has trunnions 52 projecting therefrom and pivotally received by journals in the housing 46. Bars 54 are provided to mount a motor 56 on the spindle journal 50. The spindle 24 is driven from the motor 56 through a variable speed drive, including cone pulleys 58 which may be adjusted for various effective pitch diameters. From this variable speed drive, power is transmitted through a belt 60 to an extension of the spindle 24. Pinion 62 is provided to advance the spindle 24 outwardly of the journal 50 in certain versions of the multi-purpose tool as, for example, the drill press version, and the details of this advancing means are not pertinent to the present invention. Appropriate electrical connections are made to the motor 56 and the variable speed drive may be adjusted by handle 64, or other appropriate means, seen in FIG. 1.

The trunnions 52 provide for pivotal movement of the spindle journal 50 relative to the housing 46. This movement is controlled by a pinion 66 (FIG. 2) which is formed on a shaft 68 journaled on the housing 46. The pinion 66 meshes with a gear segment 70 formed on the spindle journal 50. A sleeve 69 is telescoped over one end of the shaft 68 and is slotted to receive a pin 71 projecting from that shaft. A handle 72 projecting from the sleeve 69 enables rotation of pinion 66 to adjust the angular position of spindle 24 and blade 26. A friction device 73 limits free rotation of shaft 68 to facilitate this adjustment. A locking screw 75 is threaded into the end of shaft 68 and bears against sleeve 69 to maintain the spindle 24 in its adjusted position.

Attention is next directed to a linkage arrangement which interconnects the power head 22 and the table 28 to maintain the slot 30 aligned with the blade 26 as the angle of the blade is adjusted and/or as the height of the table 28 is adjusted. A link 74 (FIG. 4) is pivotally connected at its upper end to the spindle journal 50 and at its lower end to a lever arm 76 which is secured to a pin 78. Pin 78 is journaled on the housing 46 and has secured to its outer end a lever arm 80. A slot 82 is formed in the lever 80 and slidably receives a block 84 therein. A positioning arm 86 is pivotally connected to the block 84 by a pin 88. The arm 86 is secured by a set screw 90 to a rod 92. The rod 92 is secured at its upper end to a bracket 94 secured to the post 32. The lower end of the rod 92 is guided for sliding movement in a lug 96 projecting from the carriage 34. Preferably a stop collar 98 is secured to the rod 92 in order to obtain a correct heightwise position of the arm 86. This permits the set screw 90 to be loosened so that the arm 86 may be swung away from the lever 80 to free the block 84 from the slot 82 whereby the carriage 34 can be removed from the bars 16 when the machine is converted to another functional version.

It is preferable that the linkage connections take the illustrated parallelogram linkage form wherein the distance between the axis of trunnions 52 and the upper pivotal axis of the link 74 equals the distance between the center of pin 78 and the pivotal axis of the lower connection of link 74. And further wherein the lines interconnecting the named axis are parallel. Likewise, it is preferred that the slot 82 be parallel to the blade 26. Once this relationship is established, whatever angular relationship this spindle housing assumes, the slot 82 will remain parallel with the blade 26. Further, it is preferred that the distance between the axes of pin 78 and pin 88 equal the distance between the axis of trunnions 52 and the nominal intersection of the blade 26 and the upper surface of the table 28. With these relationships established, when the spindle journal 50 is pivoted, the lever 80 will also be pivoted and the carriage 34 drawn along the bars 16 (assuming handle 38 has been manipulated to unlock carriage 34) to maintain the slot 30 aligned with the blade 26 at all times, as will be evident from a comparison of FIGS. 3 and 4. Further, if the table 28 is raised or lowered, the carriage 34 will be slid along the rods 16 as the block 84 is guided in the slot 82. Thus, for example, if the table were raised, the carriage 34 would move progressively toward the right, again maintaining the slot 30 aligned with the blade 26 as will be evident from the phantom showing of the table 28 and arm 86 in FIG. 4.

The described circular saw version of the multi-purpose machine effectively enables the provision of a tilt arbor type of arrangement for obtaining angular cuts wherein the depth of the cut and the angle of cut may be adjusted, as desired, with the supporting table at all times maintained in a horizontal plane. The described arrangement further facilitates the multi-purpose tool to be converted into all of the usual adaptations of such multi-purpose machines.

It is to be expected that modifications of the present disclosure will appear to those skilled in the art within the scope of the inventive concepts herein described which are to be measured solely by the appended claims.

What is claimed as novel and desired to be secured by Letters Patent of the United States is:

1. In a multi-purpose power tool, a power head, a driven spindle carried by said power head with a circular saw blade mounted thereon, means for pivoting said spindle relative to said power head from a normally horizontal position to an angularly disposed position, a worktable overlying said spindle and slotted to receive said saw blade, means for adjusting the heightwise position of said table to vary the depth of cut of said blade and means responsive to both angular adjustment of said spindle and heightwise adjustment of said table for shifting the table longitudinally of the normally horizontal position of said spindle and maintaining said slot aligned with said blade when said spindle is tilted from its horizontal position.

2. In a multi-purpose power tool having a horizontal guideway, a power head, a driven spindle carried by said power head with a circular saw blade mounted thereon, means for pivoting said spindle relative to said power head from a horizontal position parallel with said guideway to an angularly disposed position, a worktable overlying said spindle and slotted to receive said saw blade, means for slidably mounting said table on said guideway, means for adjusting the heightwise position of said table to vary the depth of cut of said blade, and means responsive to both angular adjustment of said spindle and heightwise adjustment of said table for shifting the table longitudinally of said guideway and maintaining said slot aligned with said blade when said spindle is tilted from its horizontal position.

3. In a multi-purpose power tool having a horizontal guideway, a power head mounted on said guideway, a driven spindle carried by said power head with a circular saw blade mounted thereon, a spindle journal in which said spindle is rotatably mounted, said spindle journal having trunnions projecting therefrom and pivotally received by said housing, means for pivoting said journal relative to said housing to swing said spindle from a horizontal position parallel with said guideway to an angularly disposed position, a worktable overlying said spindle and slotted to receive said saw blade, means for slidably mounting said table on said guideway, means for adjusting the heightwise position of said table to vary the depth of cut of said blade, and means responsive to both angular adjustment of said spindle and heightwise adjustment of said table for shifting the table longitudinally of said guideway and maintaining said slot aligned with said blade when said spindle is tilted from its horizontal position.

4. In a multi-purpose tool having a horizontal guideway, a power head mounted on said guideway, a driven spindle carried by said power head with a circular saw blade mounted thereon, a spindle journal in which said spindle is rotatably mounted, said spindle journal having trunnions projecting therefrom and pivotally received by said housing, means for pivoting said journal relative to said housing to swing said spindle from a horizontal position parallel with said guideway to an angularly disposed position, a worktable overlying said spindle and slotted to receive said saw blade, a carriage slidably mounted on said guideway, said worktable being supported by said carriage, means for adjusting the heightwise position of said table relative to said carriage to vary the depth of cut of said blade, linkage means interconnecting said table and said spindle journal and means including said linkage means responsive to both angular adjustment of said spindle and heightwise adjustment of said table for shifting the carriage and the table with it longitudinally of said guideway and maintaining said slot aligned with said blade when said spindle is tilted from its horizontal position.

5. A multi-purpose power tool as in claim 4 wherein the carriage, and with it the table, are removable from said guideway and further wherein said linkage means is disconnectible to facilitate such removal.

6. In a multi-purpose power tool having a horizontal guideway, a power head mounted on said guideway, a driven spindle carried by said power head with a circular saw blade mounted thereon, a spindle journal in which said spindle is rotatably mounted, said spindle journal having trunnions projecting therefrom and pivotally received by said housing, means for pivoting said journal relative to said housing to swing said spindle from a horizontal position parallel with said guideway to an angularly disposed position, a worktable overlying said spindle and slotted to receive said saw blade, a carriage slidably mounted on said guideway, said worktable being supported by said carriage, means for adjusting the heightwise position of said table relative to said carriage to vary the depth of cut of said blade, a parallelogram linkage interconnecting said table and said spindle journal, said linkage comprising a link pivotally connected to said journal at its upper end, a lever arm pivotally mounted on said housing and connected at its outer end to the lower end of said link, a slotted lever arm connected to said first-named lever arm and pivotal therewith, a positioning arm mounted on said table having a follower entering the slot of said slotted lever arm, said linkage being responsive to both angular adjustment of said spindle and heightwise adjustment of said table to shift the carriage and the table therewith longitudinally of said guideway and maintain the worktable slot aligned with said blade when said spindle is tilted from its horizontal position.

7. A multi-purpose power tool as in claim 6 wherein a follower block is pivotally mounted on the end of said positioning arm and enters the slot of said slotted lever arm, the distance between the axis of said trunnions and the pivotal axis at the upper end of said link equals the distance between the pivotal mounting of said first-named lever arm and the pivotal axis of connection between said lever arm and said link, and further wherein the slot of said slotted lever is at all times parallel to said saw blade and the distance between the axis of said trunnions and the nominal intersection of said table top and said saw equals the distance from the axis of pivotal mounting of said first-named lever arm and the pivotal axis of said follower block.

8. A multi-purpose power tool as in claim 7 wherein a vertical rod is mounted on said table and said positioning arm is pivotally mounted on said rod, means are provided for locking said arm with said follower block engaged in the slot of said slotted lever arm, and further wherein means are provided for locating the heightwise position of said positioning arm on said rod.

References Cited in the file of this patent

UNITED STATES PATENTS

| | | |
|---|---|---|
| 1,081,578 | Casey | Dec. 16, 1913 |
| 1,988,102 | Woodward | Jan. 15, 1935 |
| 2,530,290 | Collins | Nov. 14, 1950 |
| 2,905,211 | Weinstein | Sept. 22, 1959 |